(No Model.)  5 Sheets—Sheet 1.

E. J. WARNER.
MACHINE FOR MAKING BUTTON EYES.

No. 365,416.  Patented June 28, 1887.

Attest:
L. Lee,
Wm Smith Morison.

Inventor,
Ezra J. Warner
per Crane & Miller attys (No Model.)  5 Sheets—Sheet 2.

E. J. WARNER.
MACHINE FOR MAKING BUTTON EYES.

No. 365,416. Patented June 28, 1887.

(No Model.) 5 Sheets—Sheet 3.

E. J. WARNER.
MACHINE FOR MAKING BUTTON EYES.

No. 365,416. Patented June 28, 1887.

Attest:
L. Lee.
Wm Smith. Morison.

Inventor.
Ezra J. Warner per
Crane & Miller attys (No Model.) 5 Sheets—Sheet 4.

E. J. WARNER.
MACHINE FOR MAKING BUTTON EYES.

No. 365,416. Patented June 28, 1887.

Attest:
L. Lee.
Wm Smith Morison.

Inventor.
Ezra J. Warner
per Crane & Miller Attys (No Model.)

E. J. WARNER.
MACHINE FOR MAKING BUTTON EYES.

No. 365,416. Patented June 28, 1887.

Attest:
L. Lee.
Wm. Smith Morison.

Inventor.
Ezra J. Warner per
Crane & Miller, Attys.

UNITED STATES PATENT OFFICE.

EZRA J. WARNER, OF NEWARK, NEW JERSEY, ASSIGNOR TO AUGUSTUS PHELPS, OF SAME PLACE.

MACHINE FOR MAKING BUTTON-EYES.

SPECIFICATION forming part of Letters Patent No. 365,416, dated June 28, 1887.

Application filed February 21, 1887. Serial No. 228,415. (No model.)

*To all whom it may concern:*

Be it known that I, EZRA J. WARNER, a citizen of the United States, residing at Newark, Essex county, New Jersey, have invented certain new and useful Improvements in Button-Eye Machines, fully described and represented in the following specification, and the accompanying drawings forming a part of the same.

The object of this invention is to feed a wire over the bending-dies, to cut off the same, to bend it at its middle, to press the ends together around the eye, and to upset the ends to form a flat foot for the eye; and the improvements consist in the various combinations of parts herein shown and described.

Figure 1:
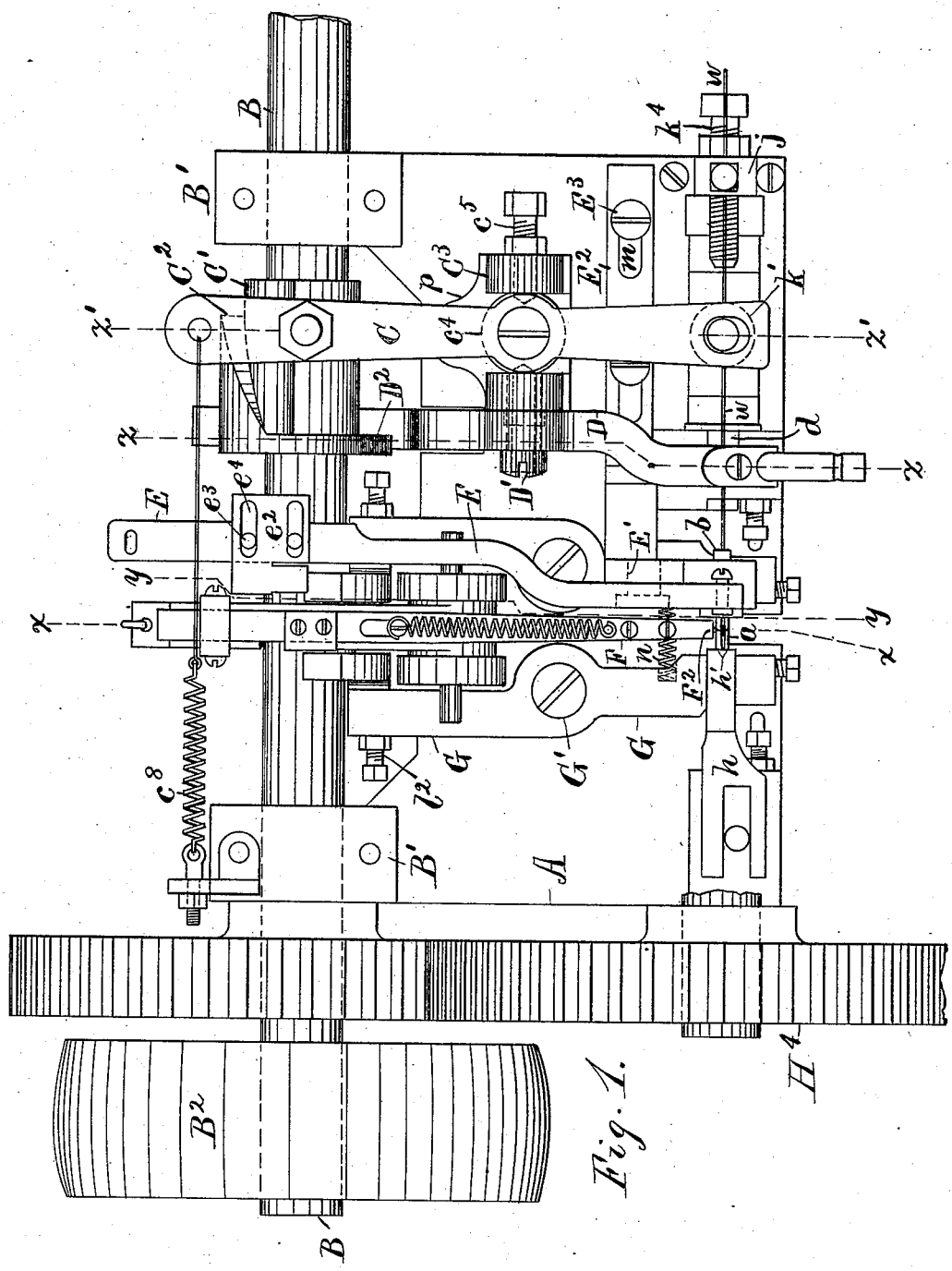
Figure 2:
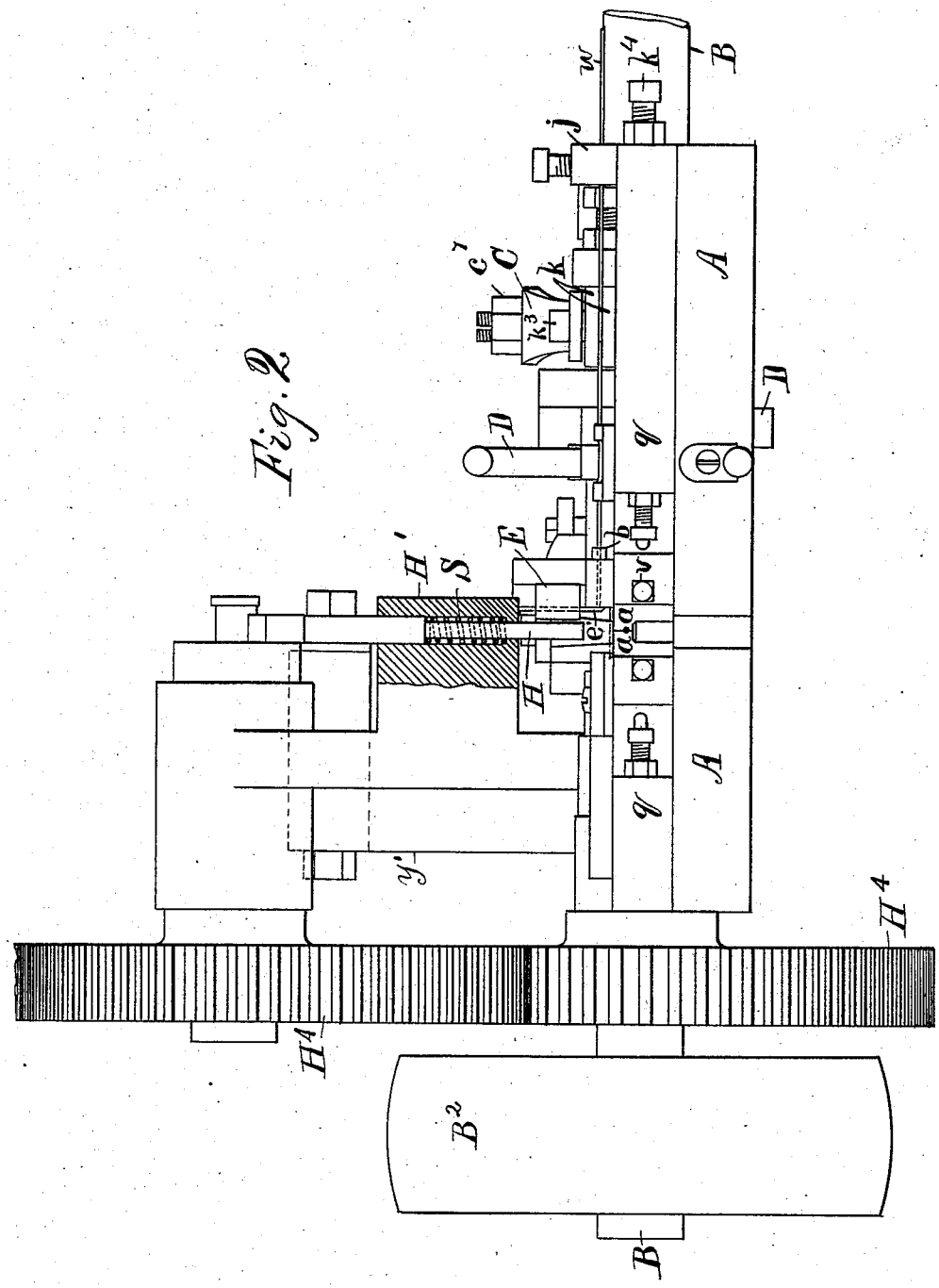
Figure 3:
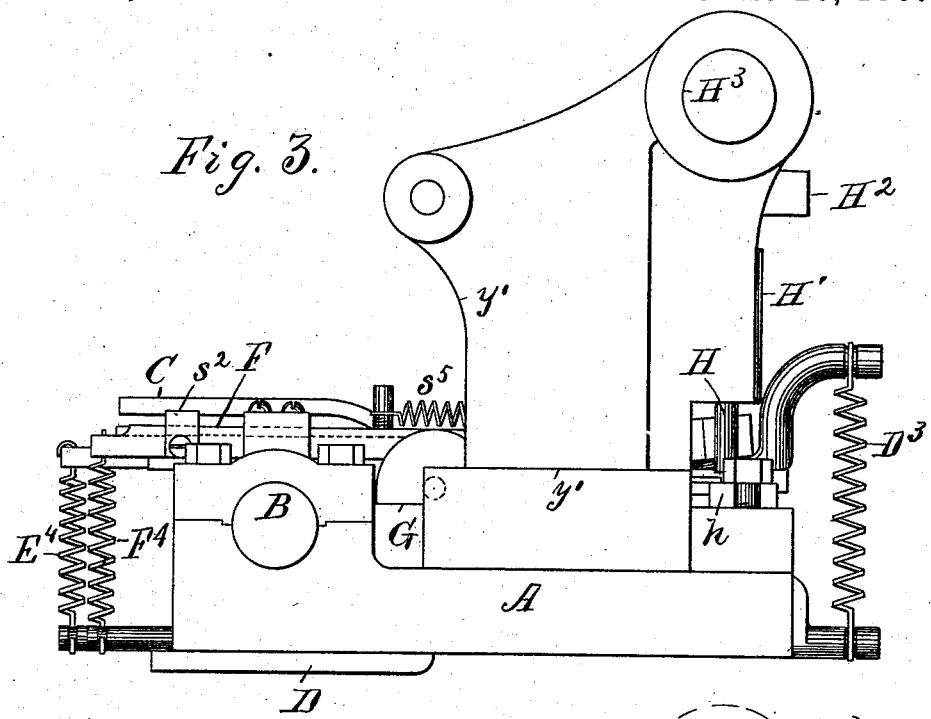
Figure 4:
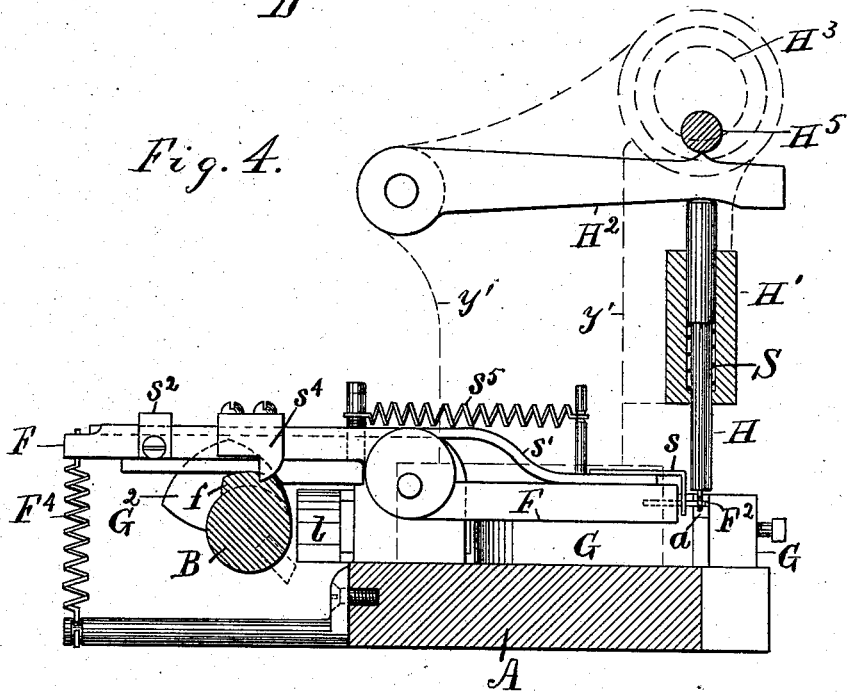
Figure 7:
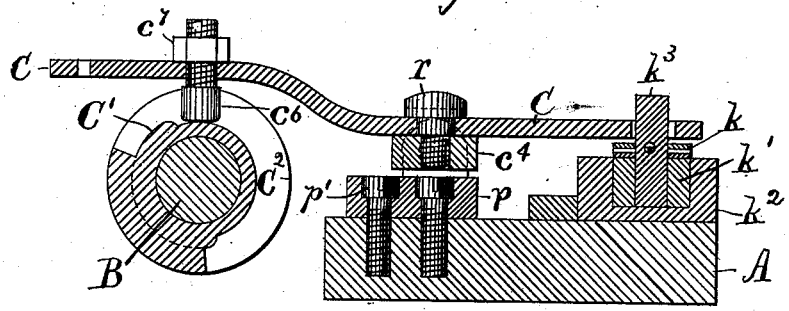
Figure 6:
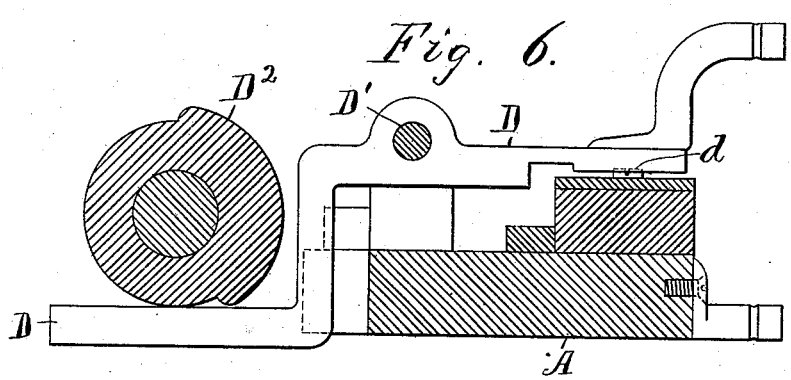
Figure 5:
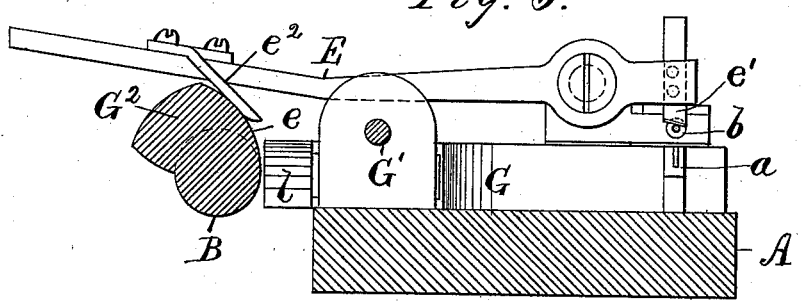
Figure 8:
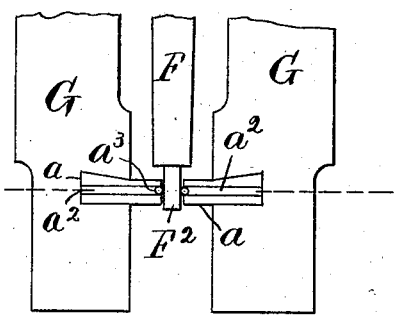
Figure 9:
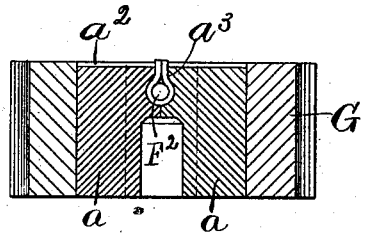
Figure 10:
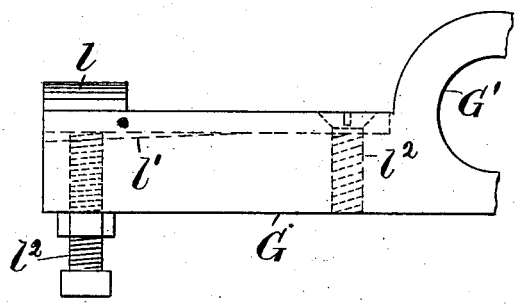

In the drawings, Figure 1 is a plan of the apparatus with the upsetting-tool removed. Fig. 2 is a front elevation of the same with the guide for the upsetting-tool in section. Fig. 3 is an end view of the machine with the driving-pulley and gear removed. Fig. 4 is a view transverse to the bed-plate, at the line $x\ x$ in Fig. 1 for displaying the bending-lever and upsetting-tool, the view exhibiting the bed-plate and one of the cams in section where hatched, as well as the guide for the upsetting-tool, and showing the actuating-lever for the upsetting-tool with the pin in section which operates the same, and the standard for the upsetting-crank shaft indicated in dotted lines $y'$. Fig. 5 is a view transverse to the bed-plate at the line $y\ y$ in Fig. 1 for displaying the cut-off lever, the parts being shown in section where hatched. Fig. 6 is a view transverse to the bed-plate at the line $z\ z$ in Fig. 1 for displaying the brake-lever, the parts being shown in section where hatched. Fig. 7 is a transverse section on line $z'\ z'$ in Fig. 1. Fig. 8 is a plan of the ends of the forming-levers with the forming-dies opened, and having the wire $w$ partly pressed therein by the bender. Fig. 9 is a transverse section on line $x'\ x'$ in Fig. 8, with the forming-dies closed and the eye shaped ready for the application of the upsetting-tool. Fig. 10 is a plan, and Fig. 11 a side view, of the rear end of the lever G.

The apparatus is provided with a bed-plate, A, and a main cam-shaft, B, sustained at the rear of the bed in bearings B', and actuated by a pulley, $B^2$, or other suitable means.

C is the feeding-lever, actuated by a cam, C', and operating upon the wire $w$, to intermittently clamp and propel the same.

D is a brake, pivoted at D' and actuated by a cam, $D^2$.

E is the cut-off lever, pivoted at E' and actuated by a cam, $e$.

F is a bending-lever, pivoted at F' and actuated by a cam, $f$.

G are the forming-levers, pivoted at G' and actuated by cams $G^2$, and H is the upsetting-tool.

The mechanism is adapted to form an eye with round body and parallel shank, as shown in section in Fig. 9, and the path of the wire, as shown in Fig. 2, is directly through a guide, $j$, in one end of the machine between two disks, $k$, compressed by the lever C beneath the brake-lever D, through a bush, $b$, adjacent to the cut-off tool $e'$, and over the forming-dies $a$. (Shown in Figs. 8 and 9.) The feeding-lever C is pivoted upon a block, $c^4$, which oscillates transversely to the lever upon the points of screws $c^5$, so that the lever may move both vertically and laterally.

In Fig. 1 the ears $C^3$ are shown at each side of the block $c^4$, projected upward from a plate, $p$; but the arrangement of the lever C above the block makes it appear as if the screws $c^5$ penetrated the lever itself. The block, however, is distinctly shown in Fig. 7 with the pivotal screw $r$ inserted through the lever into it, the plate $p$ being shown secured to the bed A by screws $p'$, which are not shown in Fig. 1. Its vertical movement is effected by the cam C', and its lateral movement by a cam-face, $C^2$.

The feed-clamp consists in a block, $k'$, movable beneath the wire in ways $k^2$, the block carrying a pin, $k^3$, perforated to permit the passage of the wire $w$. Two disks, $k$, are applied to the pin $k^3$ above and below the wire, and one end of the lever C fits loosely over the pin to press the disks when the cam C' operates upon an adjustable bearing-stud, $c^6$, held in the rear end of the lever by a nut, $c^7$. A spring, $c^8$, is applied to the rear end of the lever to move the wire-clamp normally toward the guide $j$. A set-screw, $k^4$, is adjustable toward one end of the block $k'$, to determine its throw under the influence of the spring, the cam $C^2$ giving the block a positive movement in the opposite direction, and the length of the feed is thus regulated at pleasure. The brake-lever D is pressed normally downward between wire-guides $d$ by a spring, $D^3$, (shown only in Fig. 3,) and is lifted during the progress of the feed by the cam $D^2$. The cut-off lever E is pivoted at $E'$ upon an adjustable carrier, $E^2$, in which the bush $b$ is held, and is provided with an adjustable seat, $e^2$, which may be set over the cam $e$, when the carrier $E^2$ is moved to and from the bender $F^2$, to vary the length of the wire delivered to the dies.

$h$ is the gage, fixed adjustably over the left-hand lever G, and formed with a tapering notch, $h'$, to guide the free end of the wire to a central position over the dies $a$, which are grooved upon their upper surfaces, as shown in Fig. 1, to receive the wire from the cut-off tool, as indicated at $a^2$ in Fig. 8. The forming-levers G are shown in Figs. 1 and 9 as pressed together, with the dies $a$ in contact, inclosing the bender $F^2$ and eye wholly formed, the cam-faces $G^2$ operating laterally upon the levers to separate their rear ends at the proper time. The dies are shown in the same relation in Figs. 2 and 9, but in Fig. 8 are shown separated, with the former $F^2$ pressed upon the middle of the blank to depress it and give it a staple-like form between the upper corners of the dies $a$, grooves $a^3$ guiding it in its descent.

The operation of the devices thus described is as follows: The shaft B rotates continuously, and the cams thereon operate successively, first, to lift the brake D; secondly, to press the feeding-lever upon the wire-clamp formed of the disks $k$; thirdly, to feed the wire forward through the guide $j$ and bush $b$ into the recess $h'$ in the gage; fourthly, to depress the cut-off lever and thus deposit the blank in the groove $a^2$ in the tops of the dies $a$; fifthly, to depress the bender $F^2$, which consists in a piece of round steel wire of the proper dimensions projected from the front end of the lever F, the bender thus forming the blank into a staple and carrying its loop down to the round space in the dies adapted to form the body of the eye; sixthly, to press the dies $a$ together, as shown in Fig. 9, to form the eye, the ends of the blank, if it be desired to upset the same, being adapted to project above the surface of the die, and the upsetting-tool H being then depressed to upset and flatten such ends to form a level foot upon the eye.

H is the upsetting-tool; $H'$, its guide; S, a spring to lift the tool; $H^2$, a lever pivoted upon the frame $y'$, which sustains the guide; $H^3$, the upsetting-crank shaft actuated by gears $H^4$ from the cam-shaft B, and $H^5$ an eccentric-pin operated to depress the lever and tool H at the desired time. The eye being thus formed the continued rotation of the shaft B removes the cam-faces $G^2$ from contact with the sides of the levers G, and the dies then open and the bender lifts the eye out of the same to be discharged. The discharge is effected by a stripper, $s$, Fig. 4, which encircles the bender in the rear of the dies, and is attached to a bar, $s'$, arranged to slide upon the top of the lever F, being guided at its rear end by a strap, $s^2$. A projecting pin, $s^3$, (shown in dotted lines in Fig. 4)—as its position would be on the nearer side of the section-line—is inserted in the shaft B and operates against a dog, $s^4$, affixed to the bar $s'$, to push the stripper forward at the proper time, and thus discharges the finished eye from the same. A spring, $s^5$, holds the stripper normally backward, as shown in Fig. 4, and a spring, $F^4$, serves to hold the bender normally above the dies, so that the wire may be fed beneath the same previous to the separation of the blank by the cutter $c'$.

Figure 11:
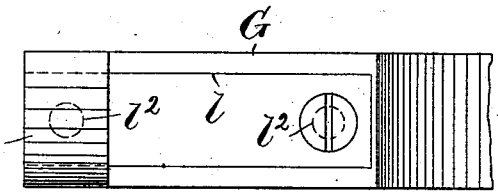

The most essential feature in my entire construction is the provision of means for adjusting the several tools to form eyes of different sizes and to compensate for the wear of the various operative surfaces. Thus the forming-levers, as shown in Figs. 10 and 11, are provided with adjustable seats $l$, fitted within recesses $l'$, and secured at one end by screws $l^2$, while the outer ends, against which the cams $G^2$ operate, are adjustable by means of set-screws $l^3$ to or from the surface of the cam. The front ends of the levers G are pressed normally apart by a spring, $n$, Fig. 1, and the rotation of the cams $G^2$ operates, with the proper adjustment of the seat $l$, to press the dies together, after the blank has been bent into staple form, to shape the eye, as shown in Fig. 9. The adjustment required for the cut-off tool is merely to and from the center of the bender, which is effected by screws E, fitted in slots $m$ in the carrier $E^2$, and by screws $e^3$, fitted into slots $e^4$ in the seat $e^2$, Fig. 1. The pressure of the feeding-lever C upon the clamping-disks $k$ is adjusted by projecting the bearing-stud $c^6$ to or from the cam $c'$ by the screw-thread which holds it in the lever, and locking it thereto by the nut $c^7$, while the adjustment of the feed itself is effected by the stop-screw $k^5$, which is movable to or from the block $k'$, which carries the clamping-disks $k$.

By the co-operation of the various devices I am enabled to form eyes for buttons or for other purposes with great rapidity and uniformity, and, by changing the feed and removing the dies $a$, which are dovetailed in the lever G, as shown in Fig. 8, and substituting others of different size, I am enabled to vary the character and size of the eyes at pleasure. The dies are held in place by set-screws $v$, inserted in the ends of the levers. Set-screws $v'$ are inserted in blocks $q$, adjacent to the outer ends of the levers G, and adjusted to limit their outward movement under the action of the spring $n$. The dies are thus held apart exactly the desired amount to accurately form the blank into a staple when the bender is depressed. The location of the dies when the bender is depressed to form such staple is accurately shown in Fig. 8, both ends of the blank being turned upward, owing to the depression of the center part in a loop between the two dies. In Figs. 8 and 9 the construction of the dies is also clearly shown, by which they are adapted, first, to form the staple by the provision of the top groove, $a^2$, and the lateral opposed grooves, $a^3$, and are also adapted to impart the final shape to the eye by the provision at the the lower ends of the lateral grooves of the half-round recesses $a^4$, which fit the body of the eye.

It is obvious that certain parts of my invention may be used without the others, and I do not therefore limit myself to the combination of all the parts shown herein.

I hereby disclaim the mere use of feeding, cutting, and bending mechanism, as I am aware that the general combination of such elements is common in all staple-forming machines.

A particular advantage in my construction is the formation of the feeding device, the brake, the cut-off, the forming-levers, the bending-lever, and the stripper with tail-pieces extending toward the single shaft B, and the application to such single shaft of all the cams necessary to actuate the said devices. The construction of the machine is thus greatly simplified, and all the parts are arranged upon the surface of a flat plate with the cam-shaft at the rear.

What I claim as my improvement, and desire to secure by Letters Patent, is—

1. In a machine for making wire button-eyes, the construction for the brake, consisting in the lever D, provided with the tail actuated by the cam $D^2$, and provided with the spring $D^3$, to press it normally upon the wire, substantially as set forth.

2. In a machine for making wire button-eyes, the construction for the cut-off, consisting in the carrier $E^2$, sustaining the wire bush $b$, and pivoted adjustably to the bed A, the lever E, pivoted at $E'$ upon the carrier, and provided with the cutter $e'$, fitted to the end of the bush $b$, and the seat $e^2$, fixed adjustably upon the tail of the lever and actuated by the cam $e$, substantially as set forth.

3. In a machine for making wire button-eyes, the combination, with the bed A, provided with wire feeding and cut-off mechanism, and the shaft B, provided with cams $f$ and $G^2$, of the forming-levers G and the bending-lever F, pivoted as described, the bending-lever being first actuated by the cam $f$ to bend the wire-blank, and the forming-levers being then actuated in opposite directions by the cams $G^2$ to close the dies, and the whole arranged and operated substantially as herein set forth.

4. In a machine for making wire button-eyes, the combination, with the bed A, provided with wire feeding and cut-off mechanism, and the shaft B, provided with cams $f$ and $G^2$, of the forming-levers G and bending-lever F, the spring $n$, for pressing the levers G apart, the set-screws $v'$, for adjusting their outward movement, and the spring $F^4$, for holding the bender normally out of the dies, the whole arranged and operated substantially as set forth.

5. In a machine for making wire button-eyes, the combination, with the bed A, provided with wire feeding and cut-off mechanism, and the shaft B, provided with cams $f$ and $G^2$, of the forming-levers G and bending-lever F, pivoted upon the bed, as described, springs for actuating the levers in opposition to the cams, the stripper $s$, longitudinally movable upon the bending-lever, with a bar, $s'$, the spring $s^5$, for retracting the stripper and the dog $s^4$, and pin $s^3$ carried by the shaft B, the whole arranged and operated substantially as set forth.

6. In a machine for making wire button-eyes, the combination, with the forming-levers G, pivoted upon the bed and actuated as described, of the dies $a$, grooved upon their upper sides and formed with a half-round recess, $a^4$, in their opposed faces to form the body of the eye, a feeding device delivering the wire over such groove $a^2$, a gage, $h$, formed with tapering notch $h'$, and a bender to press the wire downward between the dies when separated, as and for the purpose set forth.

7. In a machine for making wire button-eyes, the combination, with forming-dies, and a bender operated to bend a blank between the same, and forming-levers for closing the dies to shape the eye, of an upsetting-tool operated, substantially as described, to flatten the ends of the wires which form the shank of the eye, substantially as and for the purpose set forth.

8. In a machine for making wire button-eyes, the combination, with a flat bed, A, having a shaft, B, mounted in bearings at its rear edge and carrying the cams $C'$, $C^2$, $D^2$, $e$, $G^2$, and $f$, of the feeding mechanism actuated by the cam $D^2$, the cut-off device actuated by the cam $e$, the forming-dies actuated by the levers G and cams $G^2$, the bender actuated by the lever F and cam $f$, and an upsetting-tool mounted vertically over the forming-dies and actuated by an eccentric-pin, $H^5$, rotated by the cam-shaft B and gears $H^4$, the whole arranged and operated as and for the purpose set forth.

9. In a machine for making wire button-eyes, the forming-dies provided each with a top groove, $a^2$, a lateral groove, $a^3$, upon the inner opposed faces, and a half-round recess, $a^4$, at the lower end of such lateral grooves, substantially as herein shown and described.

In testimony whereof I have hereunto set my hand in the presence of two subscribing witnesses.

EZRA J. WARNER.

Witnesses:
AUGUSTUS PHELPS,
HENRY J. MILLER.